(12) United States Patent
Kurumisawa

(10) Patent No.: US 7,545,395 B2
(45) Date of Patent: Jun. 9, 2009

(54) COLOR FILTER, COLOR IMAGE DISPLAY DEVICE, AND ELECTRONIC APPARATUS

(75) Inventor: Takashi Kurumisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 663 days.

(21) Appl. No.: 11/170,138

(22) Filed: Jun. 30, 2005

(65) Prior Publication Data

US 2005/0264587 A1    Dec. 1, 2005

(30) Foreign Application Priority Data

Jul. 1, 2004    (JP) .............................. 2004-195732

(51) Int. Cl.
G09G 5/10    (2006.01)

(52) U.S. Cl. ..................... 345/690; 345/694; 345/89; 345/83

(58) Field of Classification Search .............. 345/83, 345/690, 692, 694, 698, 581–618, 89
See application file for complete search history.

(56) References Cited

U.S. PATENT DOCUMENTS

| | | | |
|---|---|---|---|
| 5,363,219 A * | 11/1994 | Yoshida | 358/539 |
| 5,668,646 A * | 9/1997 | Katayama et al. | 358/530 |
| 6,373,538 B2 | 4/2002 | Okumura et al. | |
| 7,268,757 B2 * | 9/2007 | Ben-David et al. | 345/88 |
| 2002/0005962 A1 * | 1/2002 | Iwasaki et al. | 358/1.9 |
| 2002/0037100 A1 * | 3/2002 | Toda et al. | 382/166 |
| 2002/0060662 A1 * | 5/2002 | Hong | 345/102 |
| 2003/0085906 A1 | 5/2003 | Elliott et al. | |

FOREIGN PATENT DOCUMENTS

| | | |
|---|---|---|
| JP | 03-201788 | 9/1991 |
| JP | 09-230310 | 9/1997 |
| JP | 09-251160 A | 9/1997 |
| JP | 11-272244 A | 10/1999 |
| KR | 1020050048833 | 5/2005 |
| WO | 02/101644 A2 | 12/2002 |
| WO | 2005050296 | 6/2005 |

* cited by examiner

*Primary Examiner*—Amr Awad
*Assistant Examiner*—Liliana Cerullo
(74) *Attorney, Agent, or Firm*—Lowe Hauptman Ham & Berner, LLP

(57) ABSTRACT

A color image display device includes a display panel including pixel regions and a color filter, the color filter including, in each pixel region, a red filter region and a cyan filter region arranged adjacent to and parallel to each other in a direction, a green filter region and a magenta filter region arranged adjacent to and parallel to each other in the direction, and a blue filter region and a yellow filter region arranged adjacent to and parallel to each other in the direction.

2 Claims, 12 Drawing Sheets

PRIOR ART
FIG. 2A
FIG. 2B
FIG. 2C
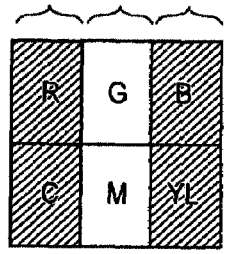
FIG. 2D
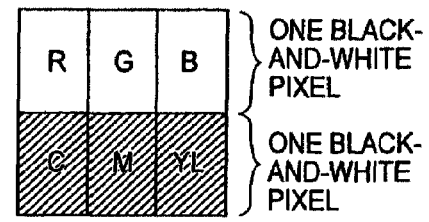

COLOR FILTER, COLOR IMAGE DISPLAY DEVICE, AND ELECTRONIC APPARATUS

RELATED APPLICATIONS

The present application is based on, and claims priority from, Japanese Application Number 2004-195732, filed Jul. 1, 2004, the disclosure of which is hereby incorporated by reference herein in its entirety.

BACKGROUND OF THE INVENTION

1. Technical Field

The present invention relates to an electro-optical device such as a liquid crystal device and to an electronic apparatus. In addition, the invention relates to an electrophoresis apparatus such as electronic paper and to an EL (electroluminescent) apparatus.

2. Related Art

Recently, color image display devices such as color liquid crystal display devices have widely been used in mobile terminal apparatuses such as mobile phones and PDAs. For example, in a liquid crystal display device, a color filter is provided on one of a pair of transparent substrates with liquid crystal held therebetween, such that color images can be displayed. Generally, in a color filter, filter regions corresponding to red (R), green (G), and blue (B) are repetitively arranged according to an additive color mixing system. That is, a red filter region, a green filter region, and a blue filter region are formed to be adjacent to each other, and one color pixel is formed by the filter regions corresponding to three colors of RGB.

In a color image display device having the color filters of three colors of RGB, when color display is performed by three colors of RGB, colors to be displayed are limited to colors in a region which is defined by an RGB color triangle on a so-called CIE chromaticity diagram. Meanwhile, color printers print color images with yellow ink, magenta ink, and cyan ink according to a subtractive color mixing system (if necessary, black ink is additionally used to print images). Such a printer can reproduce colors over a region defined by YMC on the CIE chromaticity diagram. However, since source images to be printed by printers are mostly RGB data suited for display devices, printers convert input RGB data into YMC data and print the source images using the YMC inks. For this reason, in the case in which the same source image is displayed on the display device and is printed through a printer, color reproducibility is different for each other. As a result, it is difficult to obtain satisfactory color matching between the display device and the printer.

A reflective color liquid crystal device which is provided with YMC color filters, instead of the RGB color filters, is disclosed in WO97/45766. Also, a color liquid crystal device in which a red color filter and a cyan color filter having complementary color relationship are arranged to be adjacent to each other in one pixel and white, red, and black are displayed with one pixel is disclosed in Japanese Unexamined Patent Application Publication No. 9-230310. In Japanese Unexamined patent Application Publication No. 3-201788, a method of enhancing the resolution of a display image in a color display device in which one pixel is constituted by RGB is disclosed. In this method, resolution is enhanced by driving the pixel in R, G, or B color dot units.

SUMMARY

An advantage of this invention is that it provides a color image display device which enhances color reproducibility by using a filter of a six-color configuration of RGB and YMC.

According to an aspect of the invention, in a color filter for a color image display device, a region forming one pixel has a red filter region, a green filter region, a blue filter region, a yellow filter region, a magenta filter region, and a cyan filter region. As such, in addition to the filter regions of red, green, and blue, the filter regions of yellow, magenta, and cyan are provided to constitute one pixel region, such that a displayable color range can be widened.

In the above-described color filter, it is preferable that the red filter region and the cyan filter region are adjacent to each other and are arranged parallel to each other in one direction, the green filter region and the magenta filter region are adjacent to each other and are arranged parallel to each other in the one direction, and the blue filter region and the yellow filter region are adjacent to each other and are arranged parallel to each other in the one direction.

According to the aspect of the invention, since color combinations of red and cyan, green and magenta, and blue and yellow each having complementary color relationship are arranged to be adjacent to each other, black-and-white (gray) display can be performed by each combination. That is, the three combinations perform independently black-and-white display, such that the resolution is substantially tripled. Therefore, the resolution in black-and-white display of texts or the like can be enhanced. In addition, since black-and-white display can be performed by the combinations each having complementary color relationship, blurring does not occur.

In the above-described color filter, it is preferable that the red filter region, the green filter region, and the blue filter region are arranged in line in a direction orthogonal to the one direction and form an RGB filter region, the yellow filter region, the magenta filter region, and the cyan filter region are arranged in line in the direction orthogonal to the one direction and form a YMC filter region, and the RGB filter region and the YMC filter region are adjacent to each other.

According to this configuration, since black-and-white display can be performed by the YMC filter region as well as the RGB filter region, the resolution in black-and-white can be doubled.

According to another aspect of the invention, a color image display device includes a display panel that has a color filter in which each region forming one pixel has a red filter region, a green filter region, a blue filter region, a yellow filter region, a magenta filter region, and a cyan filter region, a color calculating unit that generates six color signals having a red signal, a green signal, a blue signal, a yellow signal, a magenta signal, and a cyan signal based on an RGB signal input from an exterior, and a control unit that controls display at the filter regions of the respective colors of the display panel and that display images corresponding to the RGB signal on the display panel.

According to the above-described color image display device, in addition to the red filter region, the green filter region, and the blue filter region, the yellow filter region, the magenta filter region, and the cyan filter region are provided and all the filter regions constitute one pixel region, such that the displayable color range can be widened. Further, when input image data is an RGB signal, the color image display device generates the yellow signal, the magenta signal, and the cyan signal based on the RGB signal and performs display by the six color signals. Therefore, the RGB signal which is generally used can be used.

In the above-described color image display device, it is preferable that the color calculating unit has a unit that generates the yellow signal by performing a logical AND operation on an R signal and a G signal included in the RGB signal, a unit that generates the magenta signal by performing a logical AND operation on the R signal and a B signal included in the RGB signal, and a unit that generates the cyan signal by performing a logical AND operation on the G signal and the B signal included in the RGB signal. As such, the yellow signal, the magenta signal, and the cyan signal can be generated by a simple calculation process with the RGB signal.

On the other hand, the color calculating unit may output the R signal, the G signal, and the B signal included in the RGB signal as the red signal, the green signal, and the blue signal of the six color signals, respectively. Alternatively, the red signal may be generated by subtracting the sum of the yellow signal and the magenta signal from the R signal at a predetermined ratio, the green signal may be generated by subtracting the sum of the yellow signal and the cyan signal from the G signal at a predetermined ratio, and the blue signal may be generated by subtracting the sum of the magenta signal and the cyan signal from the B signal at a predetermined ratio.

In the above-described color image display device, it is preferable that the color calculating unit has a determining unit that determines whether the RGB signal is a black-and-white image or a color image, a black-and-white image processing unit that detects a line segment from the RGB signal, when it is determined that the RGB signal is the black-and-white image, and generates the six color signals representing the line segment, and a color image processing unit that generates the six color signals corresponding to the color image from the RGB signal when it is determined that the RGB signal is the color image.

According to this configuration, it is determined whether the input RGB signal is the black-and-white image or the color image and the six color signals are generated by a different method based on the determination result. Specifically, when the input RGB signal is the black-and-white image, it is expected that the image is an image including a character, a figure, and so on. Then, the line segment included in the image is detected and six color images representing the line segment are generated. Since the six-color filter according to the invention enhances the resolution in the vertical and horizontal directions with regard to the black-and-white image according to the arrangement, image data representing a text or the like can be clearly displayed by generating the six color signals by the above-described method. Meanwhile, when the input RGB signal is the color image, the six color signals corresponding to the color image are generated. Therefore, the color image can be displayed in a wide color reproduction range by using the six-color filter of the invention.

It is preferable that the determining unit has a unit that converts the RGB signal into a YUV signal and a unit that determines the RGB signal as the black-and-white image when a U signal and a V signal of the YUV signal are less than a predetermined value and determines the RGB signal as the color image when the U signal and the V signal of the YUV signal are equal to or more than the predetermined value. In this case, a luminance signal (Y signal) component and color difference signal (U and V signals) components are obtained from the RGB signal. Based on the ratio of the color difference signal components, it is possible to precisely determine whether the RGB signal is the black-and-white image or the color image.

Further, it is preferable that the black-and-white image processing unit detects the line segment by a line segment detecting matrix.

Further, it is preferable that the color image processing unit generates the six color signals by performing weighting operations on the predetermined number of pixels constituting the RGB signal. When the six color signals are generated from the RGB signal, the six color signals are generated based on the predetermined number of pixels of the RGB signal. At this time, the color image processing unit generates the six color signals by performing matrix operations on the predetermined number of pixels. Therefore, the resolution of the color image can be substantially enhanced.

According to still another aspect of the invention, an electronic apparatus has the above-described color image display device. As a result, an electronic apparatus that can display in a wide color reproduction range can be provided.

BRIEF DESCRIPTION OF THE DRAWINGS

The invention will be described with reference to the accompanying drawings, wherein like numbers reference like elements, and wherein:

FIG. 2A shows an arrangement of color filter regions corresponding to respective colors;

FIG. 2B shows an arrangement of color filter regions corresponding to the respective colors;

FIG. 2C shows an arrangement of color filter regions corresponding to the respective colors;

FIG. 2D shows an arrangement of color filter regions corresponding to the respective colors;

DESCRIPTION OF THE EMBODIMENTS

Hereinafter, preferred embodiments according to the invention will be described with reference to the attached drawings. Moreover, as an example of an electro-optical panel to which the invention is applied, a liquid crystal display panel will be described.

Color Filter

First, a color filter according to the invention will be described. According to the invention, a six-color filter is provided, which has regions corresponding to three colors of YMC in addition to regions corresponding to three colors of RGB, which are generally used for a color filter. Hereafter, all three colors of YMC are collectively referred to as 'YMC' and yellow is referred to as 'YL'. As a symbol representing a luminance signal of an image signal, 'Y' is used to distinguish it from the yellow signal.

Figure 1:
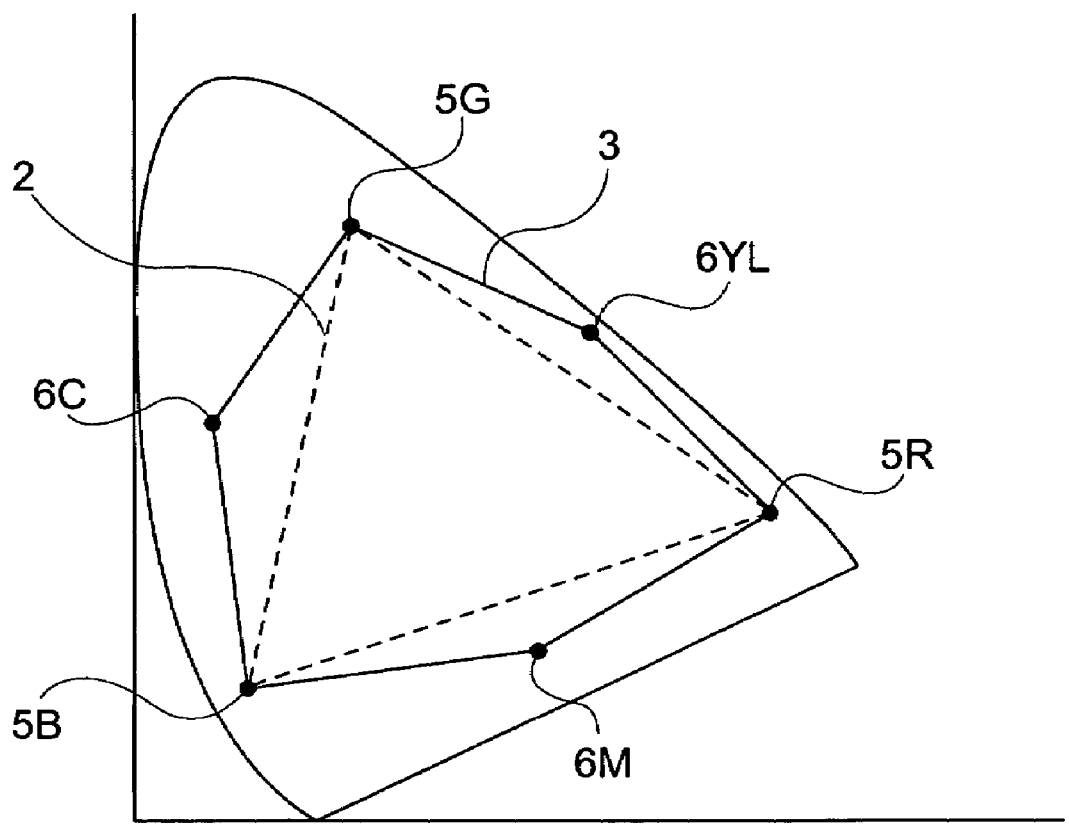
FIG. 1 is a chromaticity diagram showing a color reproduction range of a color filter according to the invention.

FIG. 1 shows a color reproduction region of a color filter on a CIE chromatic diagram. A triangular color reproduction region 2 indicated by a dashed line is a color reproduction region 2 of an RGB color filter and apexes 5R, 5G, and 5B correspond to display colors of red, green, and blue, respectively. That is, in a case of using an RGB color filter, reproducible colors are colors within the color reproduction region 2.

A color reproduction region 3 of a six-color filter 3 using YMC, in addition to RGB, is a hexagon indicated by a solid line. Apexes 6YL, 6M, and 6C correspond to yellow, magenta, and cyan, respectively. In a display device using the color filter with YMC, in addition to RGB, a color reproduction region that the display device can display increases and the display device can reproduce various colors. Therefore, when colors are reproduced with inks by a printer or colors are displayed on a display device such as a liquid crystal display device, the display colors can be adjusted.

In FIGS. 2A to 2D, examples of configurations of color filters are shown. As shown in FIG. 2A, in a general RGB color filter, filter regions of the respective colors of R, G, and B are arranged to form one pixel. However, as shown in FIG. 2B, in a six-color filter according to an embodiment of the invention, one pixel is constituted by an arrangement of filter regions of R, G, B, YL, M, and C. As such, a color reproduction region can be enlarged by using the color filter having the filter regions of six colors, as described above.

As understood from FIGS. 2A and 2B, in the case of the six-color filter shown in FIG. 2B, an area of one pixel is larger than that of the three-color filter shown in FIG. 2A. Accordingly, the display resolution is deteriorated by that amount. However, according to the embodiment, it is possible to compensate for deterioration of the resolution in black-and-white display. This will be described later.

In general, as regards human visual performance, it is known that the resolution when recognizing a black-and-white display is high, but the resolution when recognizing a color display is not as high as that. This is because, on the retina, the number of cells recognizing black and white is large and the number of cells recognizing color is small. Therefore, when the six-color filter is used, the deterioration of resolution occurs as described above. Here, if the deterioration of resolution can be compensated for in the black-and-white display, it can be considered that adverse effects due to the deterioration can be prevented.

Thus, according to the embodiment, as shown in FIG. 2B, first, combinations of RGB and YMC are respectively arranged in a horizontal direction. Since the combination of RGB makes black-and-white (gray) display possible and the combination of YMC also makes black-and-white display possible, one pixel shown in FIG. 2B can perform display corresponding to two pixels in a vertical direction. That is, even though the six-color filter shown in FIG. 2B is used, at the time of black-and-white display, it is possible to double the resolution in the vertical direction, as shown in FIG. 2D.

In addition, according to the embodiment, colors having complementary color relationship are arranged in the vertical direction. R and C, G and M, and B and YL have complementary color relationships. Accordingly, R, G, B, YL, M, and C color filters are arranged in the horizontal and vertical directions such that R and C, G and M, and B and YL are arranged in the vertical direction.

Figure 3A:
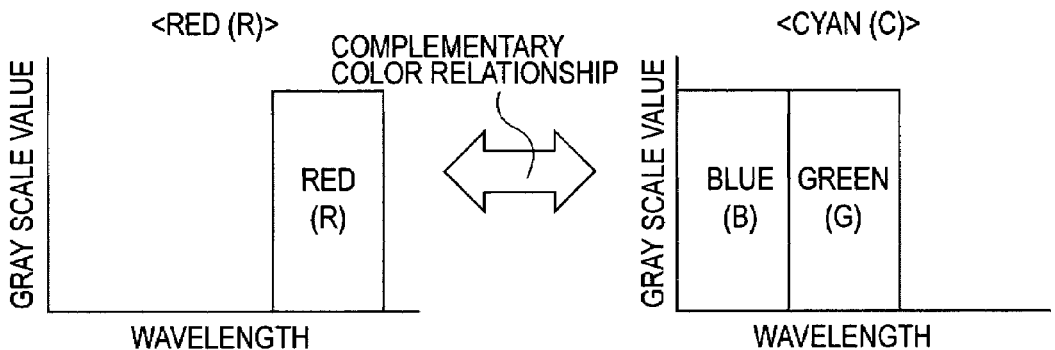
FIG. 3 shows spectral characteristics of color filters corresponding to the respective colors.
Figure 3B:
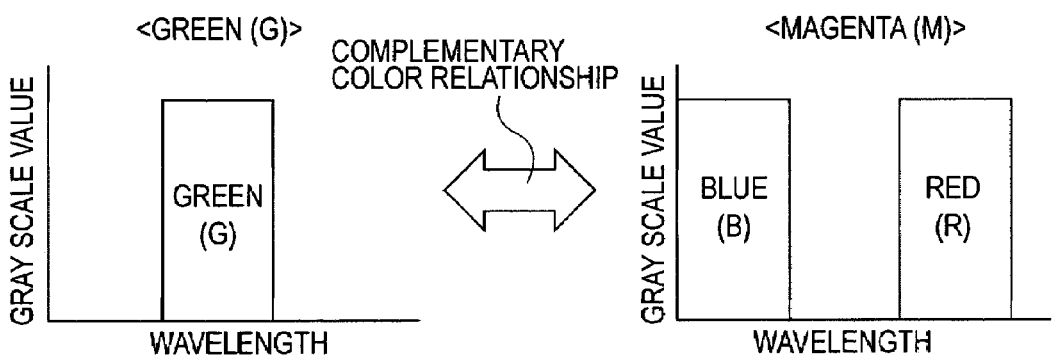
Figure 3C:
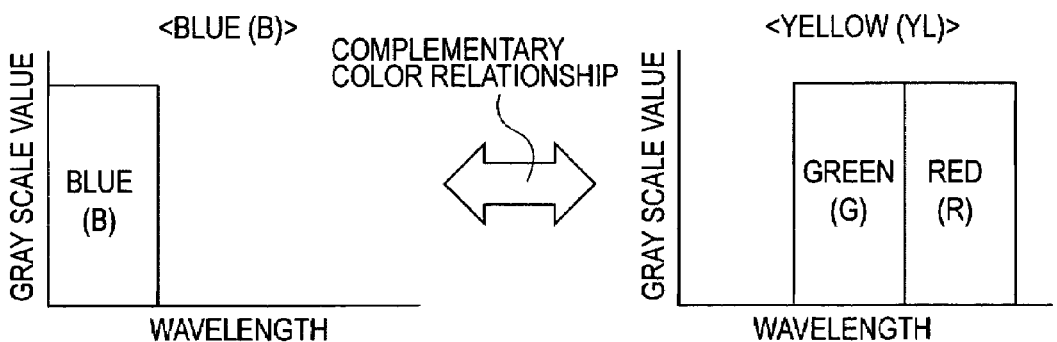

FIG. 3 shows an example of light transmission characteristics of the six-color filter. As shown in FIG. 3, since the filters of R and C cover the full wavelength range, when the filter regions of R and C are displayed with the same data (that is, the same gray-scale value), black-and-white display can be performed by their combination. For example, in a case of image data having 256 gray-scale levels, when all gray-scale values of the R and C filter regions are set to 256, black is displayed, and when all gray-scale values are set to 0, white is displayed. Also, when all gray-scale values of the R and C filter regions are set to the same value (for example, 128), gray is displayed. Similarly, this is applied to a case of the combination of G and M and a case of the combination of B and YL. Therefore, one black-and-white pixel can be formed by combining colors in complementary color relationship.

FIG. 2C shows such an example. In the example of FIG. 2C, the combination of R and C and the combination of B and YL each display black, and the combination of G and M displays white. As such, when the combinations having complementary color relationships are arranged to be adjacent to each other, one black-and-white pixel can be constituted by the combinations. Therefore, as shown in FIG. 2C, at the time of black-and-white display, it is possible to perform black-and-white display corresponding to three pixels in the horizontal direction at one pixel. As a result, it is possible to triple the resolution in the horizontal direction.

Recently, at the time of color display using three colors of RGB, a method of enhancing the resolution by controlling display in a sub pixel unit of each color of RGB has been proposed (for example, see Japanese Unexamined patent Application Publication No. 3-201788). According to this method, since it is necessary to make the gray-scale values of R, G, and B different, blurring occurs in actual display pixels. However, according to the method using the combinations of complementary colors, since the filter regions corresponding to the colors in complementary color relationship are displayed with the same gray-scale value, blurring does not occur.

As such, since the resolution is enhanced as compared to the case of performing black-and-white display with the RGB color filter, when black-and-white text is displayed on a display device, it can be read more easily.

In the example in FIG. 2B, the RGB filter regions and the CMY filter regions may be changed with each other in the vertical direction. In addition, the arrangement of RGB in the horizontal direction may be changed (for example, in the order R, B, and G from the left). However, in this case, it is necessary to arrange two colors in complementary color relationship in the vertical direction. The vertical direction and the horizontal direction may be changed with each other (that is, R, G, and B are arranged in line in the vertical direction and C, M, and YL are arranged in line in the horizontal direction).

Display Device

First Embodiment

Figure 4:
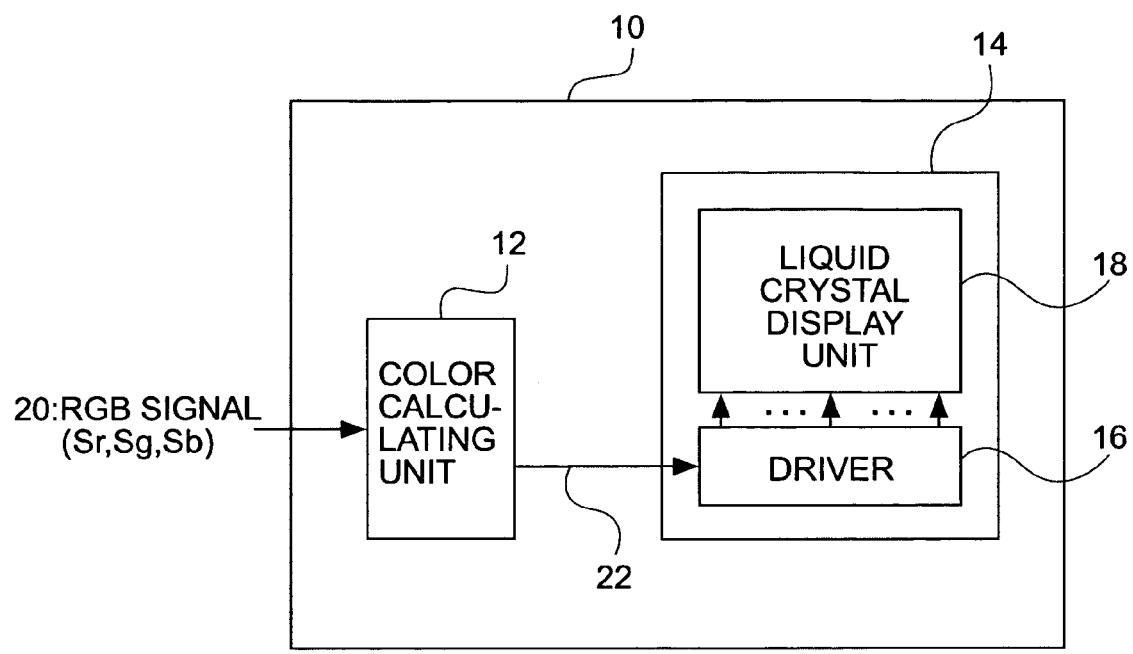
FIG. 4 schematically shows a configuration of a display device according to a first embodiment.

Next, a first embodiment of a display device to which the six-color filter is applied will be described. FIG. 4 shows a configuration of a display device 10 according to the first embodiment. The display device 10 is applicable to mobile terminals of PDAs and so on. In FIG. 4, the display device 10 according to the first embodiment has a color calculating unit 12 and a liquid crystal display panel 14. The liquid crystal display panel 14 has a liquid crystal display unit 18 and a driver 16.

The display device 10 receives an RGB signal 20 from the exterior. The RGB signal includes an R signal Sr, a G signal Sg, and a B signal Sb. The color calculating unit 12 generates six color signals 22 from the received RGB signal. The six color signals 22 correspond to R, G, B, YL, M, and C colors, respectively, and are supplied to the driver 16 in the liquid crystal display panel 14.

The liquid crystal display unit 18 is a liquid crystal display unit to which the six-color filter is applied. The driver 16 drives each pixel of the liquid crystal display unit 18 based on the input six color signals. Accordingly, as shown in FIG. 2B, each pixel constituted by the six-color filter is driven and an image input as the RGB signals 20 is displayed on the liquid crystal display unit 18.

Subsequently, the details of the color calculating unit 12 will be described. The color calculating unit 12 generates six color signals corresponding to each filter region of the six-color filter provided in the liquid crystal display unit 18.

Figure 5:
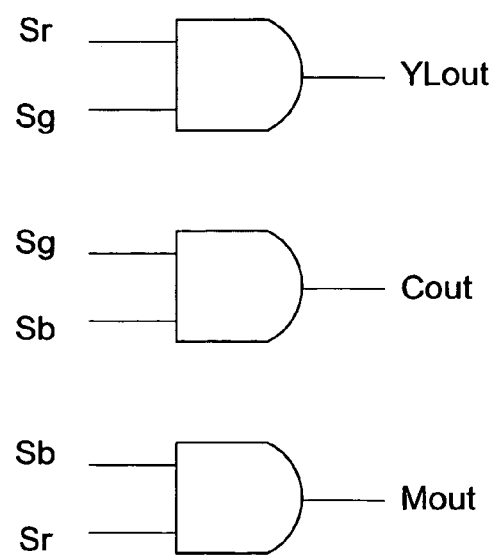
FIG. 5 shows an example of a calculation performed by a color calculating unit shown in FIG. 4.

First, a first generation method of the six color signals will be described. The spectral characteristic of each of R, G, B, YL, M, and C is shown in FIG. 3. Accordingly, for example, the cyan signal can be generated by a logical product (AND) of the blue signal Sb and the green signal Sg. Similarly, the magenta signal Sm can be generated by a logical product of the blue signal Sb and the red signal Sr, and the yellow signal Sy can be generated by a logical product of the green signal Sg and the red signal Sr. In FIG. 5, the calculation generating each of the YL, M, and C signals is shown by a logical circuit. Meanwhile, as R, G, and B signals, R, G, and B signals input as the RGB signal 20 can be used as they are. As a result, each color component of the six color signals is obtained as follows.

Rout=Sr

Gout=Sg

Bout=Sb

Cout=Sg AND Sb

Mout=Sb AND Sr

YLout=Sr AND Sg

Next, a second generation method of the six color signals will be described. In the first generation method, since the YL, M, and C signals are generated based on the input RGB signal 20 and each color signal of the input RGB signal 20 is output as an output, a display image can have higher density than an original image. In the second generation method, the YL, M, and C signals are generated similarly to the first generation method, but each R, G, and B output signal is generated by subtracting a component reflected in the YMC signal from each color signal of the input RGB signal 20 at a predetermined ratio. Specifically, each color component of the six color signals is obtained as follows.

Rout=b {Sr−a(Yout+Mout)}

Gout=b {Sg−a(Yout+Cout)}

Bout=b {Sb−a(Mout+Cout)}

Cout=Sg AND Sb

Mout=Sb AND Sr

YLout=Sr AND Sg

Here, a and b are coefficients determined by the design of an intensity component of each color of the six-color filter.

As such, according to the second generation method, it is possible to approximate the density to the density of the source image as a whole. In addition, according to this method, the YMC signal can be generated from the input RGB signal and color reproducibility can be arbitrarily adjusted using the six-color filter. Accordingly, it is possible to realize color reproducibility required for the display device by determining the coefficients a and b in consideration of the characteristics of the six-color filter.

Second Embodiment

Figure 6:
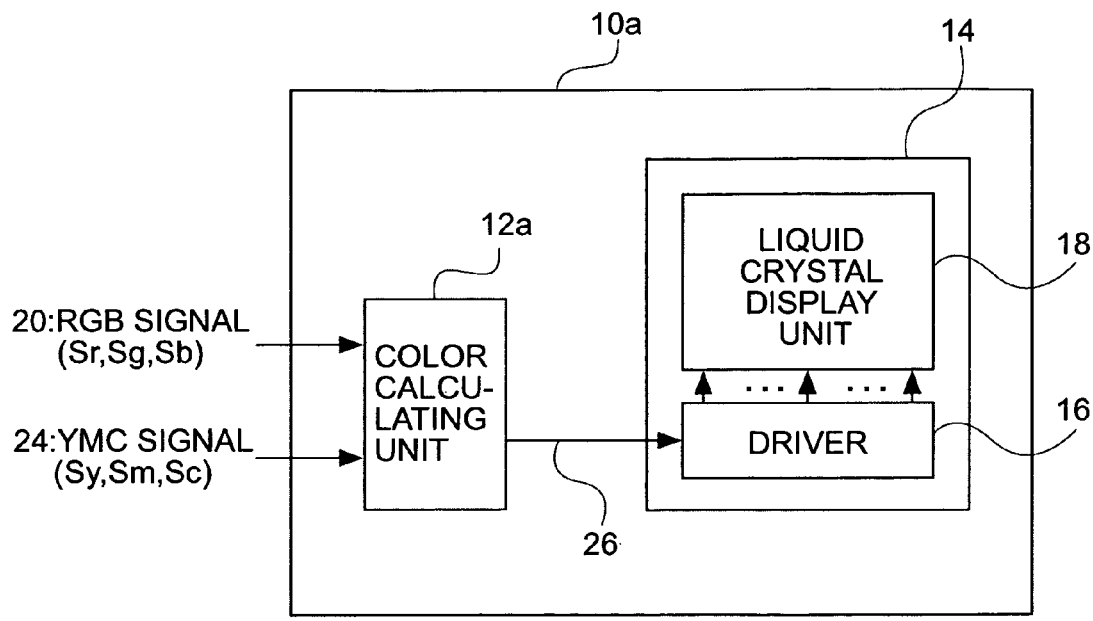
FIG. 6 schematically shows a configuration of a display device according to a second embodiment.

Next, a second embodiment of the display device will be described. FIG. 6 shows a configuration of a display device 10a according to the second embodiment. In the display device 10 shown in FIG. 4, when the RGB signal 20 is input, the six color signals are generated based on the RGB signal 20 and an image is displayed on the liquid crystal display panel 14 on which the six-color filter is mounted. In the second embodiment, the display device 10a is constituted such that the YMC signal 24 also is input thereto. That is, when the source image is input as the RGB signal 20, like the display device 10, the display device 10a generates the six color signals from the RGB signal 20 and provides them to the liquid crystal display panel 14. When the source image is input as the YMC signal 24, a color calculating unit 12a generates the six color signals 26 from the YMC signal 24 and provides them to the liquid crystal display panel 14.

Figure 7:
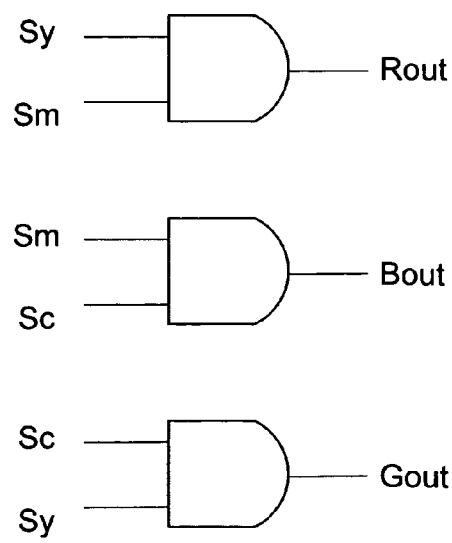
FIG. 7 shows an example of a calculation performed by a color calculating unit shown in FIG. 6.

When the YMC signal 24 is input, the color calculating unit 12a performs the color calculation for generating the RGB signal from the YMC signal. The calculation is similar to the calculation for generating the YMC signal from the RGB signal. Specifically, as understood from FIG. 3, the R signal can be obtained by a logical sum (OR) of the M signal and the Y signal, the G signal can be obtained by a logical sum of the C signal and the Y signal, and the B signal can be obtained by a logical sum of the C signal and the Y signal. Namely, the color calculating unit 12a can generate the RGB signal by a logical circuit shown in FIG. 7 when the YMC signal is input.

In this case, like the first generation method of YMC signals, the input YMC signal may be used as it is, as YMC signal to be output as the six color signals. Like the second generation method, the YMC signal can be obtained by subtracting the component of the RGB signal generated from the YMC signal from the original YMC signal at a predetermined ratio.

The display device 10a according to the second embodiment can be used, for example, for display an image to be printed by a printer with color reproducibility approximating the printing result. Accordingly, it is possible to display the source image on the display device 10a with the same color reproducibility as that obtained by the printer by displaying source image data input as the RGB signal or the YMC signal on the liquid crystal display panel 14 on which the six-color filter is mounted.

Third Embodiment

Figure 8:
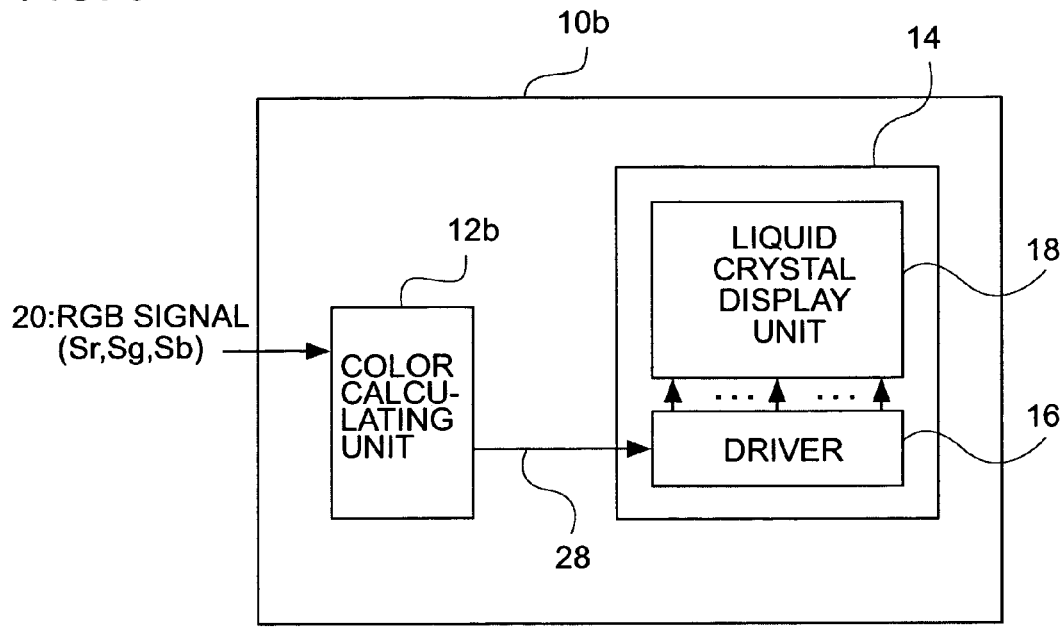
FIG. 8 is a block diagram showing a configuration of a display device according to a third embodiment.

Next, a third embodiment of the display device will be described. FIG. 8 shows a configuration of a display device 10b according to the third embodiment. Like the display device 10 according to the first embodiment, the RGB signal is input as an input signal. However, in the third embodiment, a color calculating unit 12b generates the six color signals 28 with a different method from the method in the first embodiment and output them.

As described above, the six-color filter according to the invention has a wide color reproduction region with regard to a color image signal as compared to the general RGB color filter. Meanwhile, since six-color pixels constitute one color pixel, the resolution is deteriorated. In a case of the black-and-white image, it is possible to compensate for the deterioration of resolution by the arrangement of the six colors as described above.

According to features of the third embodiment, it is determined whether an input image is a black-and-white (achromatic) image or a color (chromatic) image and a different process is performed according to the determination result. In particular, when the input image is the black-and white image, a line segment (vertical line and horizontal line) is detected from the input image and display emphasizing the line segment is performed by allocating black or white to each pixel. Accordingly, when input image is a text, a character, a figures, and so on can be precisely displayed.

Meanwhile, when the input image is the color image, the six color signals suitable for the six-color filter of the invention are generated from the predetermined number of pixel data of input image data. In this case, a gray-scale value of a certain pixel is determined by using a predetermined matrix. The gray-scale value of the certain pixel is determined in consideration of gray-scale values of pixels around the certain pixel. Therefore, the resolution is substantially enhanced.

Figure 9:
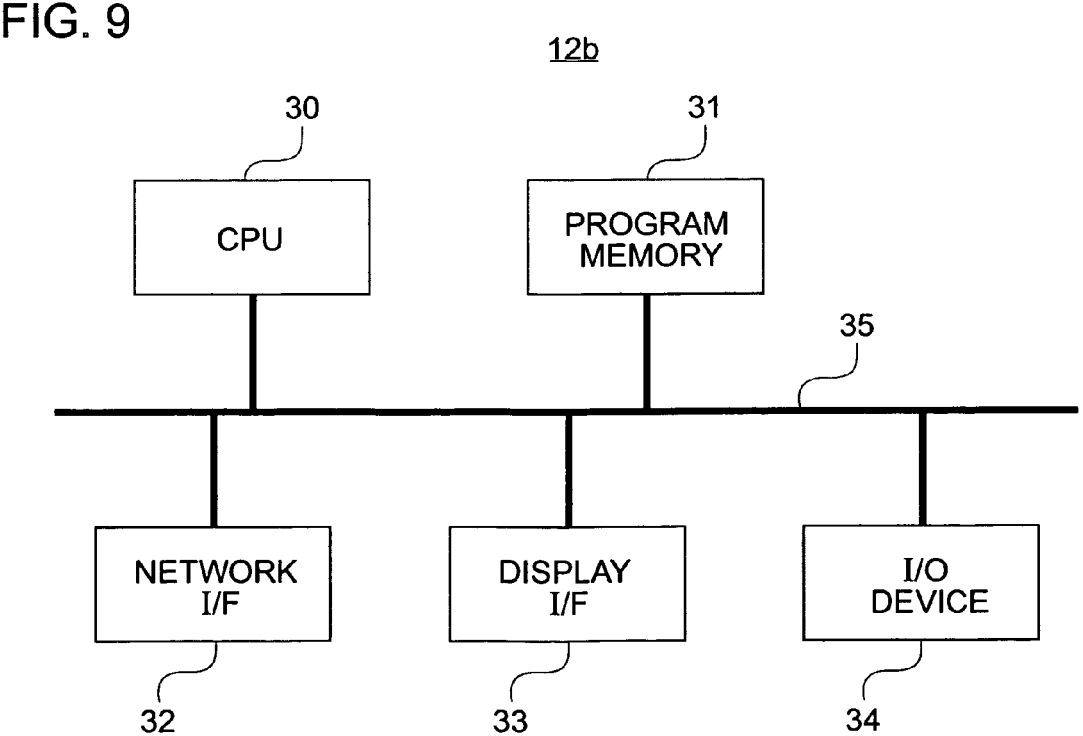
FIG. 9 is a block diagram showing a schematic configuration of a color calculating unit according to the third embodiment.

FIG. 9 is a block diagram showing a schematic configuration of the color calculating unit 12b in a case of performing the color calculation by a software process for generating the color signal suitable for the six-color filter. The color calculating unit 12b is constituted such that a CPU 30, a program memory 31, a network I/F 32, a display I/F 33, and an I/O device 34 are connected by a bus 35. The program memory 31 stores a color calculation program, which will be described later. The network I/F 32 is used for obtaining a source image from a network. The display I/F 33 is an interface for providing the six color signals 28 obtained by the color calculations to the liquid crystal display panel 14. The I/O device 34 is a device to be used when a user selects source images or gives an instruction. The CPU 30 controls each component of the color calculating unit 12b and performs the color calculation as described later by performing the color calculation program stored in the program memory 31.

Figure 10:
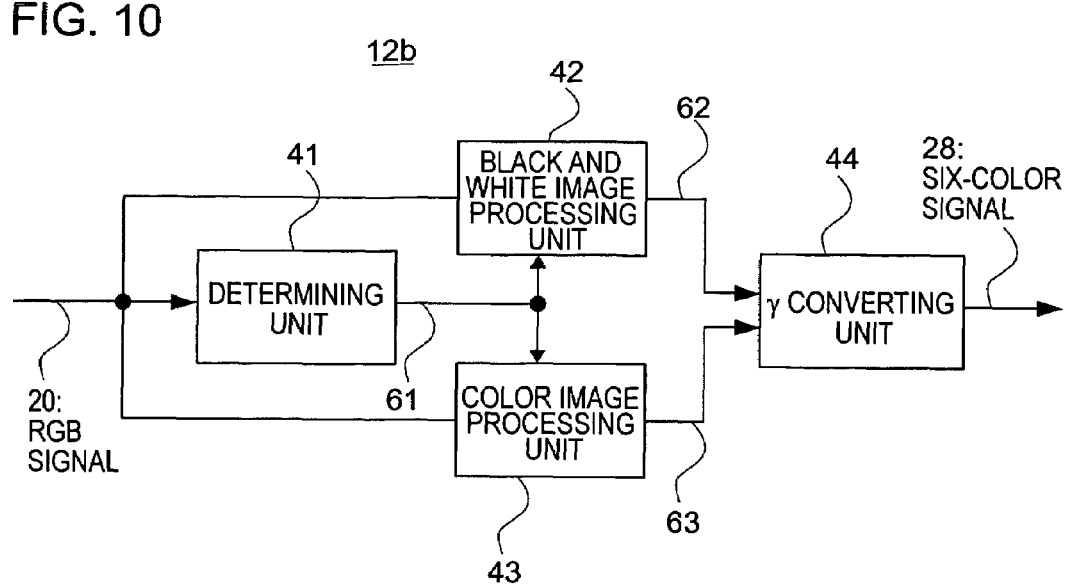
FIG. 10 is a functional block diagram showing the color calculating unit according to the third embodiment.

FIG. 10 is a functional block diagram of the color calculation unit 12b. The color calculation unit 12 has functionally a determining unit 41, a black-and-white image processing unit 42, a color image processing unit 43, and a γ converting unit 44. Basically, the CPU 30 performs a predetermined program stored in the program memory 31 such that these components are realized.

The RGB signal 20 input to the color calculating unit 12b is input to the determining unit 41, the black-and-white image processing unit 42, and the color image processing unit 43. The determining unit 41 converts the RGB signal 20 into the YUV signal so as to generate a luminance signal Y and color difference signals U and V. Based on the obtained color difference signals, it is determined whether the input RGB signal is the black-and-white image or the color image. Specifically, it is determined whether or not the color difference signals U and V are less than a predetermined value X. When the color difference signals U and V are less than the predetermined value X, the determining unit 41 determines that the input image is the black-and-white image, and when the color difference signals U and v are equal to or more than the predetermined value X, the determining unit 41 determines that the input image is the color image. As the predetermined value X, a value of 0.1 (that is, 10%) can be used. In this case, the determining unit 41 determines that an image the color component of which is less than 10% is the black-and-white image and that an image the color component of which is equal to or more than 10% is the color image. A determination result signal 61 obtained as described above is sent to the black-and-white image processing unit 42 and the color image processing unit 43.

When the determination result signal 61 indicates that the input image is the black-and-white image, the black-and-white image processing unit 42 performs a lining process to generate an image signal 62 having an emphasis line and sends the image signal 62 to the γ converting unit 44. Meanwhile, when the determination result signal 61 indicates that the input image is the color image, the color image processing unit 43 performs a color pixel rendering process to generate an image signal 63 having enhanced resolution and sends the image signal 63 to the γ converting unit 44. The γ converting unit 44 γ-converts the supplied image signals 62 and 63 based on a predetermined γ characteristic and outputs the γ-converted image signals as six color signals 28.

Figure 11:
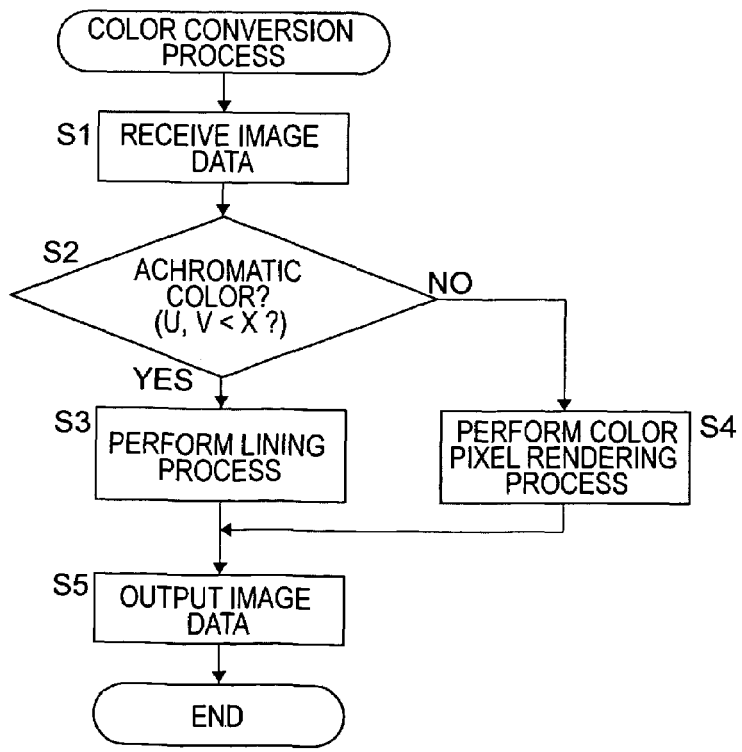
FIG. 11 is a flowchart illustrating a color calculation process according to the third embodiment.

FIG. 11 is a flowchart of a color calculation process performed by the color calculating unit 12b. The CPU 30 performs the color calculation program which allows the CPU 30 to function as the respective components shown in FIG. 10, such that the color calculating process is realized as described above. First, the determining unit 41 receives image data (That is, RGB signal 20) from the exterior (Step S1). Next, the determining unit 41 generates the color difference signals U and V by the YUV-conversion and determines whether the input image is the black-and-white (achromatic) image or the color (chromatic) image by comparing the color difference signals U and V to the predetermined value X (Step S2).

when the input image is the black-and-white image (Yes in Step S2), the black-and-white image processing unit 42 performs the lining process. Meanwhile, when the input image is the color image (No in Step S2), the color image processing unit 43 performs the color image rendering process. As a result, the black-and-white image signal 62 or the color image signal 63 is generated. Then, the γ converting unit 44 γ-converts one of them and outputs the γ-converted signal as one of the six color signals 28 to the liquid crystal display panel 14.

Next, the lining process performed by the black-and-white image processing unit 42 will be described in detail.

(1) Case of generating the six color signals From six pixel data

When the six color signals are generated from data corresponding to six pixels (three pixels by two pixels) of the input image, the black-and-white image processing unit 42 detects vertical lines and horizontal lines by applying a vertical line detection matrix and horizontal line detection matrix shown in FIG. 12 to the Y signal corresponding to the six pixels of the input image. FIG. 12A shows the horizontal line detection matrix. The left matrix detects a horizontal line (a black line) positioned at the upper of the six pixel region and the right matrix detects a horizontal line (a black line) positioned at the lower of the six pixel regions.

Figure 12A:
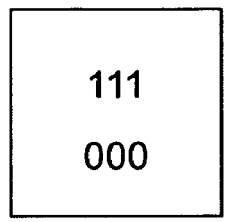
FIG. 12A shows matrixes which are used for a lining process according to the third embodiment.
Figure 12A:
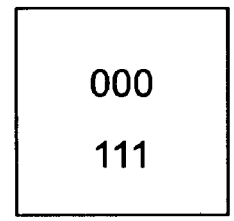
Figure 12B:
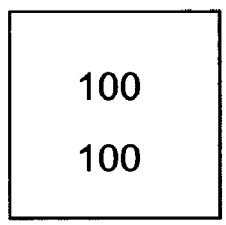
FIG. 12B shows matrixes which are used for the lining process according to the third embodiment.
Figure 12B:
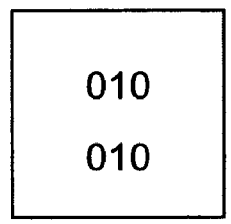
Figure 12B:
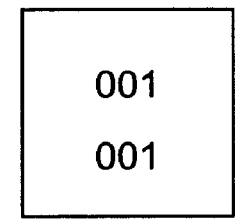
Figure 12C:
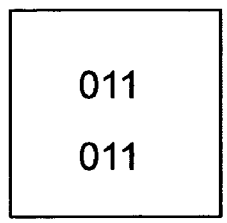
FIG. 12C shows matrixes which are used for the lining process according to the third embodiment.
Figure 12C:
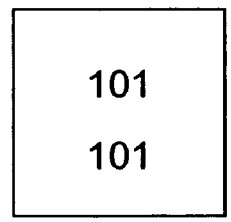
Figure 12C:
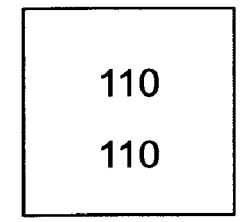

FIGS. 12B and 12C shows the vertical line detection matrixes. In FIG. 12B, the left matrix detects a vertical line (a black line) positioned the left of the six pixel regions, the middle matrix detects a vertical line (a black line) positioned at the middle of the six pixel regions, and the right matrix detects a vertical line (a black line) positioned at the right of the six pixel regions. Meanwhile, In FIG. 12C, the left matrix detects a vertical line (a white line) positioned at the left of the six pixel regions, the middle matrix detects a vertical line (a white line) positioned at the middle of the six pixel regions, and the right matrix detects a vertical line (a white line) positioned at the right of the six pixel regions.

When the line segments (line) in the input image is detected by the matrix, the black-and-white image processing unit 42 allocates a gray-scale value corresponding to black or white to each pixel positioned on the line. For example, in a case that each pixel is expressed by 256 gray-scale levels (white is a gray-scale value of '0' and black is a gray-scale value '255'), the black-and-white image processing unit 42 allocates the gray-scale value corresponding to black to a pixel positioned on the black line and allocates the gray-scale value corresponding to white to a pixel positioned on the white line. Then, the black-and-white image processing unit 42 outputs the image signal 62 obtained by using the above-described method as a six color signals 28.

The six color signals 28 are displayed by the six-color filter shown in FIG. 2B. As described with reference to FIGS. 2A to 2D, in the six-color filter of the invention, the black-and-white resolution corresponding to two pixels can be obtained in the vertical direction by the combinations of RGB and YMC and the black-and-white resolution corresponding to three pixels can be obtained in the horizontal direction by the combinations of complementary colors. Thus, when the image signal 62 obtained by the lining process is displayed, the doubled black-and-white resolution of the vertical direction and the tripled black-and-white resolution of the horizontal direction can be obtained. Therefore, it is possible to display a black-and-white image having high resolution.

(2) Case of generating the six color signals from three pixel data

When the six color signals are generated from data corresponding to six pixels (three pixels by two pixels) of the input image, since it is impossible to detect the vertical line, the horizontal line is detected by a horizontal line detection filter shown in FIG. 12A. The subsequent process is the same process as that in the case of generating the six color signals from six pixel data. The black-and-white image processing unit 42 allocates the gray-scale value corresponding to black to a pixel positioned on the black line so as to generate the image signal 62 and outputs the generated image signal 62. In this case, the black-and-white resolution corresponding to two pixels can be obtained in the vertical direction. Therefore, it is possible to display a black-and-white image having high resolution.

Next, the color pixel rendering process performed by the color image processing unit 43 will be described.

(1) Case of generating the six color signals from six pixel Data

Figure 13:
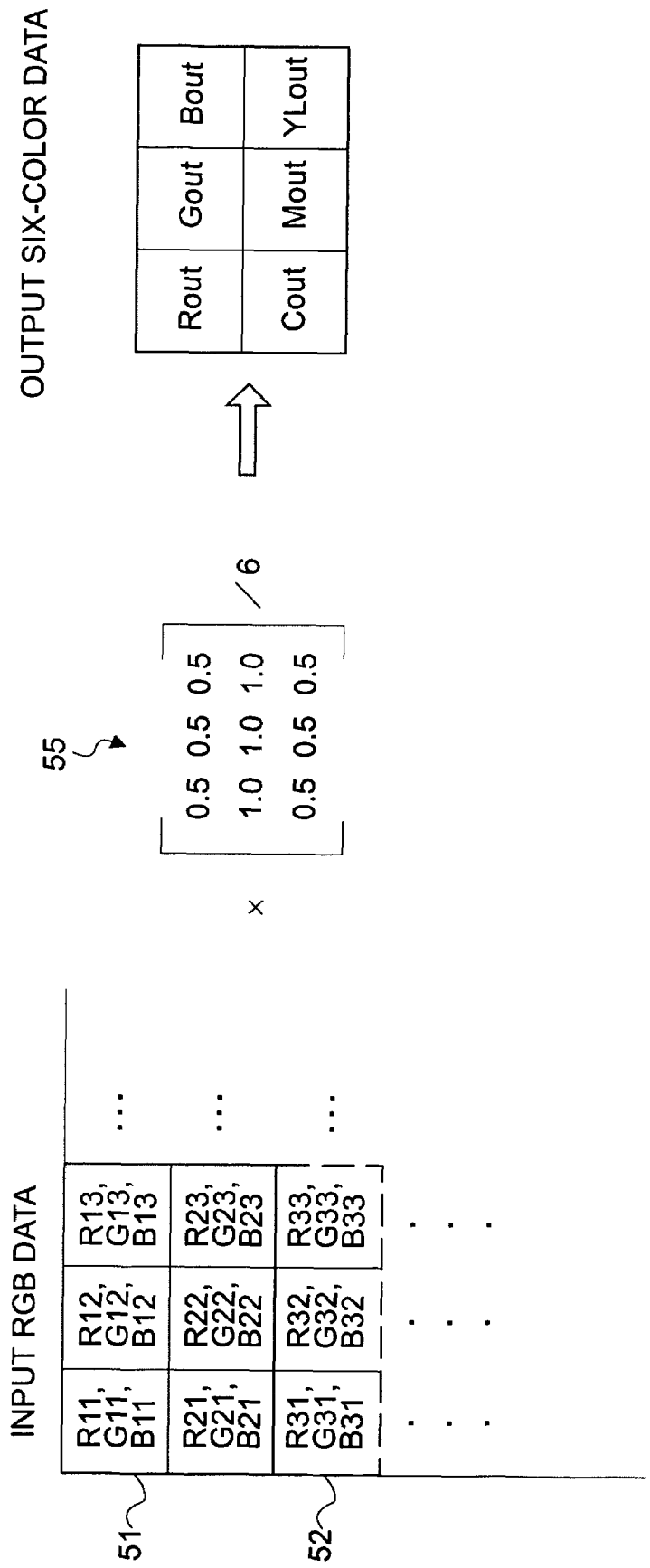
FIG. 13 shows an example of a color pixel rendering process according to the third embodiment.

FIG. 13 schematically shows the color pixel rendering process in the case of generating the six color signals from six pixel data. Now, as shown at the left of FIG. 13, it is considered that six color data corresponding to six pixel regions (three pixels by two pixels) 51 as a part of an input image are generated.

(a) First Method

A first method is similar to the second generation method of the first embodiment. That is, an input RGB signal is expressed as follows.

$$Sr=(R1+R2+R3+R4+R5+R6)$$

$$Sg=(G1+G2+G3+G4+G5+G6)$$

$$Sb=(B1+B2+B3+B4+B5+B6)$$

Therefore, the six color signals are expressed as follows.

$$Rout=\beta\{Sr-\alpha(Yout+Mout)\}$$

$$Gout=\beta\{Sg-\alpha(Yout+Cout)\}$$

$$Bout=\beta\{Sb-\alpha(Mout+Cout)\}$$

$$Cout=\theta(Sg \text{ AND } Sb)$$

$$Mout=\theta(Sb \text{ AND } Sr)$$

$$YLout=\theta(Sr \text{ AND } Sg)$$

Here, $\alpha$, $\beta$, and $\theta$ are coefficients determined by a design of an intensity component of each color of the six-color filter.

In this method, since the depth of the gray-scale is extended to six times, gray-scale reproducibility is enhanced, as compared to the case that RGB data for one pixel is input, and color expression becomes rich. For example, in the case that input R color image data is 8 bits (256 gray-scale), output data Rout can be expressed as 256×6 gray-scale levels.

(b) Second Method

In a second method, as shown in FIG. 13, a matrix calculation is used. As shown in FIG. 13, with regard to data (three pixels by two pixels) of six pixel regions 51 disposed at a predetermined position of input image data, normalized output six color data is obtained by multiplying a 3×3 matrix 55 for every nine pixel data (three pixels by three pixels) including respective three pixel regions (in FIG. 3, the lower side) disposed at the upper or lower of that region and by dividing the multiplication result by '6'. Since the matrix 55 has '1.0' as a coefficient in the middle horizontal line and has '0.5' as coefficients in the upper and lower horizontal lines, the six color data is generated based on pixels in the upper and lower horizontal lines. That is, the six color data is determined by a weighting calculation of neighboring pixels using the matrix 55. As a result, the resolution is substantially enhanced in the vertical direction.

Specifically, each output data is obtained by the following expression.

$$Rout=(0.5R11+0.5R12+0.5R13+1.0R21+1.0R22+1.0R23+0.5R31+0.5R32+0.5R33)/6$$

$$Gout=(0.5G11+0.5G12+0.5G13+1.0G21+1.0G22+\\1.0G23+0.5G31+0.5G32+0.5G33)/6$$

$$Bout=(0.5B11+0.5B12+0.5B13+1.0B21+1.0B22+\\1.0B23+0.5B31+0.5B32+0.5B33)/6$$

$$Cout=Gout \text{ AND } Bout$$

$$Mout=Bout \text{ AND } Rout$$

$$Yout=Rout \text{ AND } Gout$$

In such a manner, it is possible to generate pixel data of R, G, B, YL, M and C, which are suitable for the six-color filter of the invention, from the RGB input image data corresponding to the six pixels.

(2) Case of generating the six color signals from three pixel data

Figure 14:
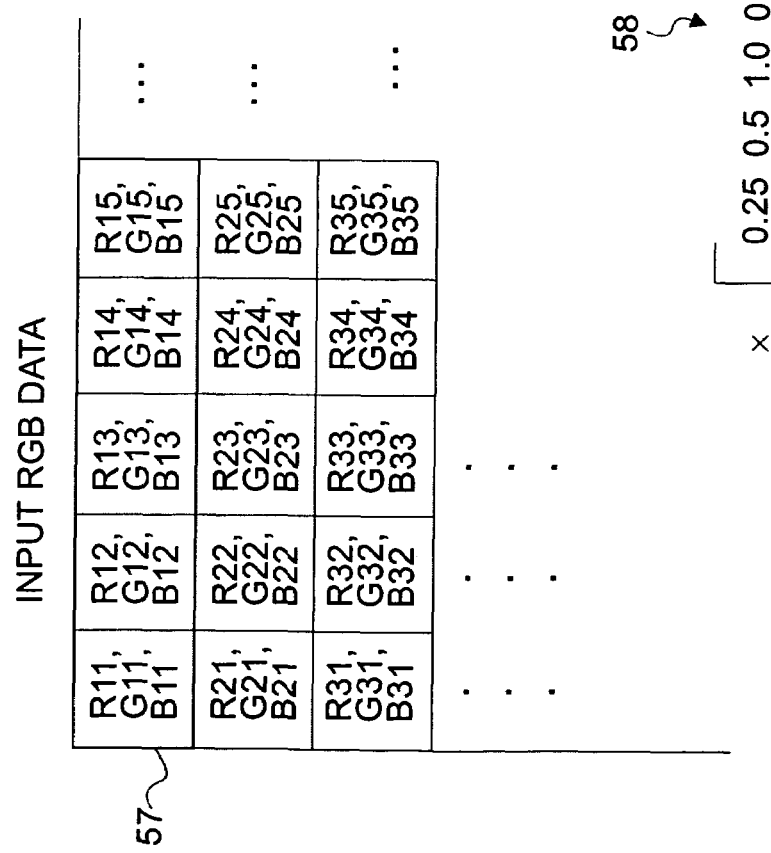
FIG. 14 shows another example of the color pixel rendering process according to the third embodiment.

FIG. 14 schematically shows a process in the case of generating the six color signals from three pixel data. Now, as shown at the left of FIG. 14, it is considered that six color data corresponding to a region 57 constituted by three pixels as a part of an input image are generated.

(a) First Method

A first method is similar to the second generation method of the first embodiment. That is, the input RGB signal is expressed as follows.

$$Sr=(R1+R2+R3)$$

$$Sg=(G1+G2+G3)$$

$$Sb=(B1+B2+B3)$$

Therefore, the six color signals are obtained as follows.

$$Rout=\beta\{Sr-\alpha(Yout+Mout)\}$$

$$Gout=\beta\{Sg-\alpha(Yout+Cout)\}$$

$$Bout=\beta\{Sb-\alpha(Mout+Cout)\}$$

$$Cout=\theta(Sg \text{ AND } Sb)$$

$$Mout=\theta(Sb \text{ AND } Sr)$$

$$YLout=\theta(Sr \text{ AND } Sg)$$

Here, $\alpha$, $\beta$, and $\theta$ are coefficients determined by a design of an intensity component of each color of the six-color filter.

In this method, since the depth of the gray-scale is extended to six times, gray-scale reproducibility is enhanced, as compared to the case that RGB data for one pixel is input, and color expression becomes rich. For example, in the case that input R color image data is 8 bits (256 gray-scale levels), output data Rout can be expressed as 256×6 gray-scale levels.

(b) Second Method

In a second method, as shown in FIG. 14, a matrix calculation is used. As shown in FIG. 14, with regard to three pixel data (horizontal three pixels) disposed at a predetermined position of input image data, normalized output six color data is obtained by multiplying a 1×5 matrix 58 for every data (horizontal five pixels) in five pixel regions 57 including respective one pixel disposed at the left and right of the three pixel regions and by dividing the multiplication result by '2.5'. Since the matrix 58 has '1.0' as the middle coefficient, has '0.5' as coefficients of pixels at the left and right of the middle, and has '0.25' as the leftmost and rightmost coefficients of the matrix 58, the output six color data is generated by a weighting calculation of neighboring pixels. As a result, the resolution is substantially enhanced in the horizontal direction.

Specifically, each output data is obtained by the following expression.

$$Rout=(0.25R11+0.5R12+1.0R13+0.5R14+0.25R15)/\\2.5$$

$$Gout=(0.25G11+0.5G12+1.0G13+0.5G14+0.25G15)/\\2.5$$

$$Bout=(0.25B11+0.5B12+1.0B13+0.5B14+0.25B15)/\\2.5$$

$$Cout=Gout \text{ AND } Bout$$

$$Mout=Bout \text{ AND } Rout$$

$$Yout=Rout \text{ AND } Gout$$

As described above, it is possible to generate pixel data of R, G, B, YL, M, and C colors, which are suitable for the six-color filter of the invention, from RGB input image data corresponding to the six pixels.

Liquid Crystal Display Panel

Figure 15:
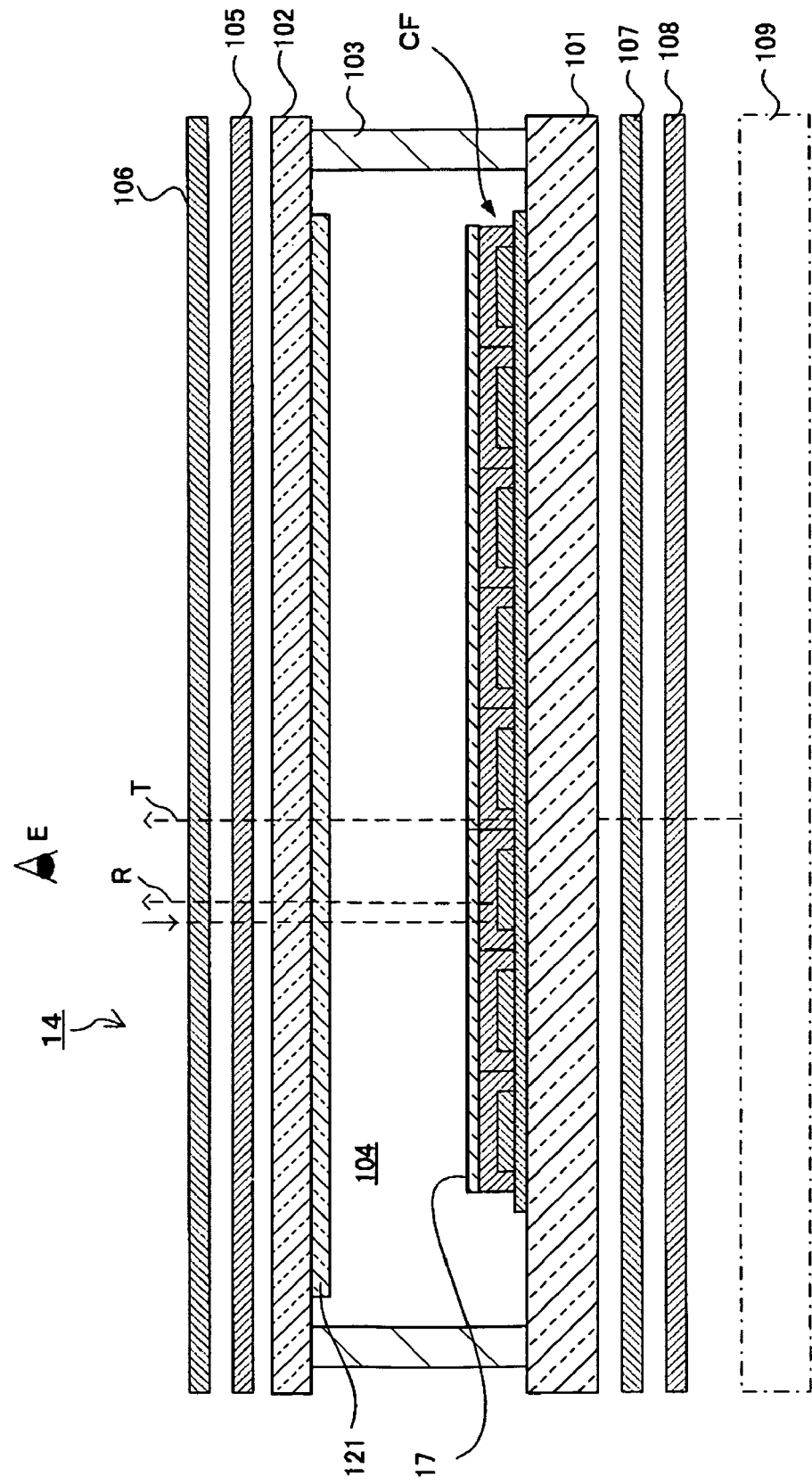
FIG. 15 shows a configuration of a liquid crystal display panel to which the invention is applied.

Next, an example of a liquid crystal display panel to which a color filter substrate of the invention is applied will be described. In this example, the color filter substrate to which the six-color filter is applied is applied to a transflective liquid crystal display panel 14. FIG. 15 is a cross-sectional view of the liquid crystal display unit 18.

As shown in FIG. 15, in the liquid crystal display panel 14, a substrate 101 and a substrate 102, which are made of glass or plastic, are bonded by a sealant 103, and a liquid crystal 104 is sealed therebetween. In addition, on an outer surface of the substrate 102, a retardation film 105 and a polarizing plate 106 are sequentially arranged, and, on an outer surface of the substrate 101, a retardation film 107 and a polarizing plate 108 are sequentially arranged. Furthermore, at the lower of the polarizing plate 108, a backlight 109 is arranged to emit illumination light at the time of performing transmissive display.

The substrate 101 is a transparent substrate such as a glass substrate and the above-described six-color filter CF is formed thereon. Specifically, the R, G, B, YL, M, and C filter regions are formed in the arrangement as described above. If necessary, a transparent resin scattering layer made of acryl resin or the like is formed on the substrate 101. In addition, in a reflective region, the color filter corresponding to each color is formed on a metallic reflective film.

In addition, if necessary, a black matrix is formed at a boundary of the color filter corresponding to each color. Transparent electrodes 17 made of a transparent conductive material such as ITO (Indium Tin Oxide) are formed on the color filter CF. The plurality of transparent electrodes are arranged in stripes. The plurality of transparent electrodes 17 expand in a direction perpendicular to transparent electrodes 121 which are similarly formed on the substrate 102 in stripes, and the elements of the liquid crystal display panel 14 included in intersection regions of the transparent electrodes 17 and the transparent electrodes 121 constitute pixel regions.

Meanwhile, on the inner surface of the substrate 102, the transparent electrodes 121 are formed to intersect the transparent electrodes 17 on the counter substrate 101. If necessary, an alignment film or the like is formed on the transparent electrodes 17 on the substrate 101 and on the transparent electrodes 121 on the opposing substrate 102.

In the liquid crystal display panel 14, in the case of performing reflective display, light from an exterior, which is incident on the region where the metallic reflective film is formed, travels along a path R shown in FIG. 15, is reflected from the metallic reflective film, and has visual contact with a viewer. Meanwhile, in the case of performing transmissive display, the illumination light emitted from the backlight 109 is incident on a transmissive region, travels along a path T, and has visual contact with the viewer.

The above-described liquid crystal display panel is just an example to which the six-color filter of the invention is applied. Alternatively, the six-color filter of the invention is applicable to liquid crystal display panels having various configurations.

Electronic Apparatus

Next, an example of an electronic apparatus to which the liquid crystal display panel according to the invention can be applied will be described with reference to FIGS. 16A to 16B.

First, an example in which the liquid crystal display panel according to the invention is applied to a portable personal computer will be described. FIG. 16A is a perspective view showing a configuration of the personal computer. As shown in FIG. 16A, the personal computer 410 includes a main body 412 having a key board 411 and a display unit 413 to which the liquid crystal display panel according to the invention is applied.

Subsequently, an example in which the liquid crystal display panel according to the invention is applied to a display unit of a mobile phone will be described. FIG. 16B is a perspective view showing a configuration of the mobile phone. As shown in FIG. 16B, the mobile phone 420 includes a plurality of operation buttons 421, a receiver 422, a transmitter 423, and a display unit 424 to which the liquid crystal display panel according to the invention is applied.

Figure 16A:
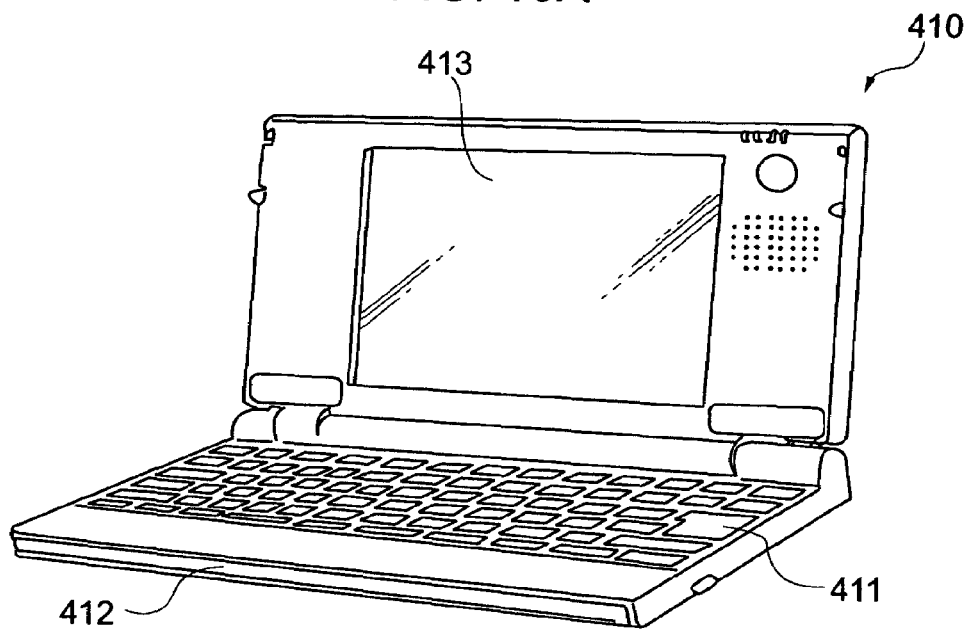
FIG. 16A is an example of an electronic apparatus according to the invention.
Figure 16B:
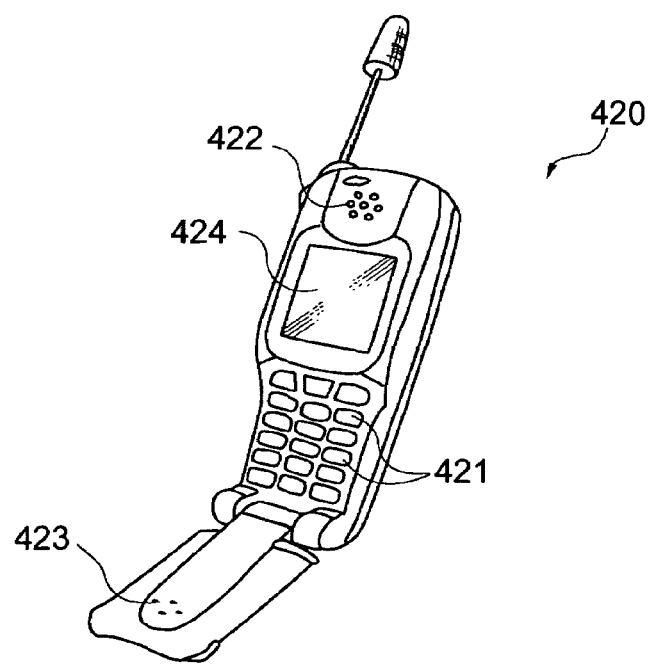
FIG. 16B is an example of an electronic apparatus according to the invention.

Further, the electronic apparatus in which the electro-optical device according to the invention can be employed may include devices having a mobile phone, a mobile personal computer, a liquid crystal television, a viewfinder-type or monitor-direct-view-type video tape recorder, a car navigation device, a pager, an electronic organizer, an electronic calculator, a word processor, a workstation, a videophone, a POS terminal, and a digital still camera, in addition to the personal computer shown in FIG. 16A or the mobile phone shown in FIG. 16B.

MODIFICATIONS

This invention is not limited to the substrate and the liquid crystal device which have the above-described reflective film and the color filter. For example, it can be suitably modified within a range without departing from the spirit of this invention The liquid crystal device has been described as the example in the above-described embodiments. For example, as the electro-optical device of this invention, an electrophoresis device such as an electronic paper and an electroluminescent (EL) device can be exemplified.

What is claimed is:

1. A color image display device, comprising:
a display panel including pixel regions and a color filter, the color filter including, in each pixel region:
a red filter region and a cyan filter region arranged adjacent to each other in a first direction and parallel to each other in a second direction,
a green filter region and a magenta filter region arranged adjacent to each other in the first direction and parallel to each other in the second direction,
a blue filter region and a yellow filter region arranged adjacent to each other in the first direction and parallel to each other in the second direction, and
a color calculating unit for, based on an RGB input signal from an external source, generating six color output signals including a red output signal, a green output signal, a blue output signal, a yellow output signal, a magenta output signal, and a cyan output signal; and
a control unit for, based on the six color output signals, controlling the display panel, at the red filter region, the green filter region, the blue filter region, the yellow filter region, the magenta filter region, and the cyan filter region, to display an image corresponding to the RGB input signal,
wherein the color calculating unit is configured to:
generate the yellow output signal by performing a logical AND operation on a red input signal and a green input signal included in the RGB input signal;
generate the magenta output signal by performing a logical AND operation on the red input signal and a blue input signal included in the RGB input signal; and
generate the cyan output signal by performing a logical AND operation on the green input signal and the blue input signal included in the RGB input signal, and
generate the red output signal, the green output signal, and the blue output signal using the following relationships:

$$Rout=b\{Sr-a(Yout+Mout)\};$$

$$Gout=b\{Sg-a(Yout+Cout)\};$$

$$Bout=b\{Sb-a(Mout+Cout)\};$$

wherein Sr is the red input signal, Sg is the green input signal, Sb is the blue input signal, Rout is the red output signal, Gout is the green output signal, Bout is the blue output signal, Yout is the yellow output signal, Cout is the cyan output signal, Mout is the magenta output signal, and a and b are coefficients of an intensity component of the six color output signals.

2. The color image display device according to claim 1, wherein:
the red filter region, the green filter region, and the blue filter region are juxtaposed in the second direction to form an RGB filter region,
the yellow filter region, the magenta filter region, and the cyan filter region are juxtaposed in the first direction orthogonal to the second direction to form a YMC filter region, and
the RGB filter region and the YMC filter region are adjacent to each other.

* * * * *